United States Patent [19]
Phillips et al.

[11] Patent Number: 5,482,135
[45] Date of Patent: Jan. 9, 1996

[54] COMBINED HYDRAULIC RESERVOIR AND VEHICLE AXLE

[75] Inventors: David L. Phillips, Mayville; Michael J. Jenkins, Milwaukee, both of Wis.

[73] Assignee: Deere & Company, Moline, Ill.

[21] Appl. No.: 85,218

[22] Filed: Jun. 29, 1993

[51] Int. Cl.⁶ .................................................. B60K 7/00
[52] U.S. Cl. .................................... 180/308; 180/312
[58] Field of Search .................................. 180/305, 306, 180/307, 308, 312, 242

[56] References Cited

U.S. PATENT DOCUMENTS

| | | | |
|---|---|---|---|
| 2,431,719 | 12/1947 | Wilkin | 180/242 X |
| 2,793,876 | 5/1957 | Allwes | 180/308 X |
| 2,833,362 | 5/1958 | Martin | 180/307 |
| 3,485,315 | 12/1969 | Bergren | 180/306 |
| 3,996,999 | 12/1976 | Termont et al. | 165/41 |
| 4,322,086 | 3/1982 | Bennik | 280/5 R |
| 4,512,414 | 4/1985 | Kuhn et al. | 172/112 |
| 4,932,209 | 6/1990 | Okada et al. | 180/307 X |
| 5,133,174 | 7/1992 | Parsons, Jr. | 56/6 |
| 5,211,077 | 5/1993 | Louis et al. | 174/606 |
| 5,232,330 | 8/1993 | Rae et al. | 414/686 |

*Primary Examiner*—Margaret A. Focarino
*Assistant Examiner*—Victor E. Johnson

[57] ABSTRACT

A hydraulic mechanism for driving a vehicle, and having right and left laterally spaced hydraulic motors which drive respective ground engaging wheels, an axle structure extending laterally between the right and left hydraulic motors for receiving operating loads from the ground engaging wheels, the right and left hydraulic motors being coupled with the axle structure for generally enclosing and sealing the axle structure, said generally sealed axle structure being adapted for containing hydraulic fluid and serving as a fluid reservoir, a hydraulic pump which drives the hydraulic motors, said pump being in operative fluid communication with the interior of the axle structure for drawing fluid therefrom, the pump being positioned outside the axle structure. The motors include input and output ports which are positioned within the axle structure, and hydraulic lines extend between the pump and the input and output ports. Portions of said hydraulic lines extend within the interior of the axle structure, and the interior lines include rigid and non-rigid lines which facilitate assembly and disassembly of the mechanism.

19 Claims, 3 Drawing Sheets

5,482,135

COMBINED HYDRAULIC RESERVOIR AND VEHICLE AXLE

BACKGROUND OF THE INVENTION

This invention relates to hydraulic systems for driving vehicle wheels and other vehicle components or implements.

Vehicles used for maintaining golf courses typically include reel mowers for cutting grass accurately. Hydraulic systems are carried by these vehicles for driving the reel mowers, the vehicle's drive wheels and other vehicle components such as power steering. These hydraulic systems typically include a single main pump and a plurality of motors which drive the respective wheels, reel mowers and components. It is known to provide these golf course mowing vehicles with front wheels driven by respective hydraulic motors supported at outer ends of a laterally extending structure which acts as a load bearing axle. Hydraulic hose lines extend from the pump to the various motors. Hydraulic return lines also extend from the motors to the pump. A reservoir is typically carried by the vehicle and serves as a container from which the main pump may draw fluid as needed. The various motors typically include case drains which allow fluid which has leaked from the motor to be drained from a motor's case. Hydraulic lines extend from the various case drains to a manifold which routes the drained fluid into the reservoir. The pump, reservoir, manifold and various hydraulic hose lines occupy a relatively large volume and generally clutter the interior of the vehicle. Servicing internal vehicle components can therefore be relatively difficult.

Another type of hydraulic system includes conventional right and left drive wheel axle shafts supported by a sealed housing. A pump-motor is provided which allows the operator to infinitely vary the rate at which the drive wheels are driven. The pump-motor includes an input shaft which is driven by the vehicle's power source. The pump-motor also includes an output shaft which mechanically drives the right and left axle shafts. The axle shafts are supported within a housing, which contains hydraulic fluid for lubricating the axle shafts and the gears which operatively couple the axles with the output shaft. The housing also acts as a sump from which the pump-motor may draw hydraulic fluid as needed. This type of system does not include separate right and left driven hydraulic wheel motors, but rather provides a single hydraulic motor which drives both right and left axle shafts.

It would be desirable to provide a turf mowing vehicle having separate hydraulic motors for driving respective right and left drive wheels. It would also be desirable for such a vehicle's interior to be uncluttered, and not crowded with hydraulic system components and hoses. It would also be desirable for such a mechanism to be easily assembled to thereby allow relatively quick and inexpensive manufacturing. It would be desirable for such a mechanism to allow relatively easy access to interior vehicle components for service. Furthermore, it would be desirable for such a hydraulic system to be easily disassembled as required for maintenance.

SUMMARY OF THE INVENTION

The preferred embodiment of the present invention provides an arrangement of hydraulic components usable on a golf and turf type mowing vehicle. The vehicle includes right and left front driven wheels and respective right and left hydraulic motors which drive the front wheels. A hydraulic pump carried at the rear of the vehicle drives the hydraulic motors and other vehicle components such as reel mower cutting units. An axle structure extends laterally between the right and left motors. The motors are fixed in sealing abutment to the outer end portions of the axle structure. The axle structure is generally sealed for containing hydraulic fluid, and thereby serves as the hydraulic system's fluid reservoir. The pump is coupled with the axle reservoir to draw fluid therefrom as needed. Hydraulic lines extend between the pump and the motors for transferring fluid power therebetween. The input and output ports of the motors are positioned within the interior of the axle reservoir, and therefore some of the hydraulic lines extending between the pump and motors are positioned within the axle reservoir. The interior hydraulic lines include both rigid and non-rigid line sections which facilitate assembly and disassembly of the hydraulic mechanism. The rigid interior lines act to align themselves with openings in the axle reservoir wall to thereby allow the exterior lines to be easily connected. The non-rigid interior lines each extend in a loop within the reservoir to provide slack which allows the motors to be detached from the axle reservoir structure without requiring the non-rigid interior lines to be uncoupled. The motors include case drains which empty directly into the interior of the axle reservoir, thereby eliminating the need for additional hydraulic lines for routing fluid from the case drain to the reservoir. A coupling mechanism is provided for coupling the interior hydraulic lines in fluid communication with the exterior hydraulic lines near the wall of the axle reservoir. The coupling mechanism also serves to operatively seal the axle-reservoir at the location whereat the hydraulic lines pass through the wall of the axle reservoir.

DESCRIPTION OF THE PREFERRED EMBODIMENT

Figure 1:
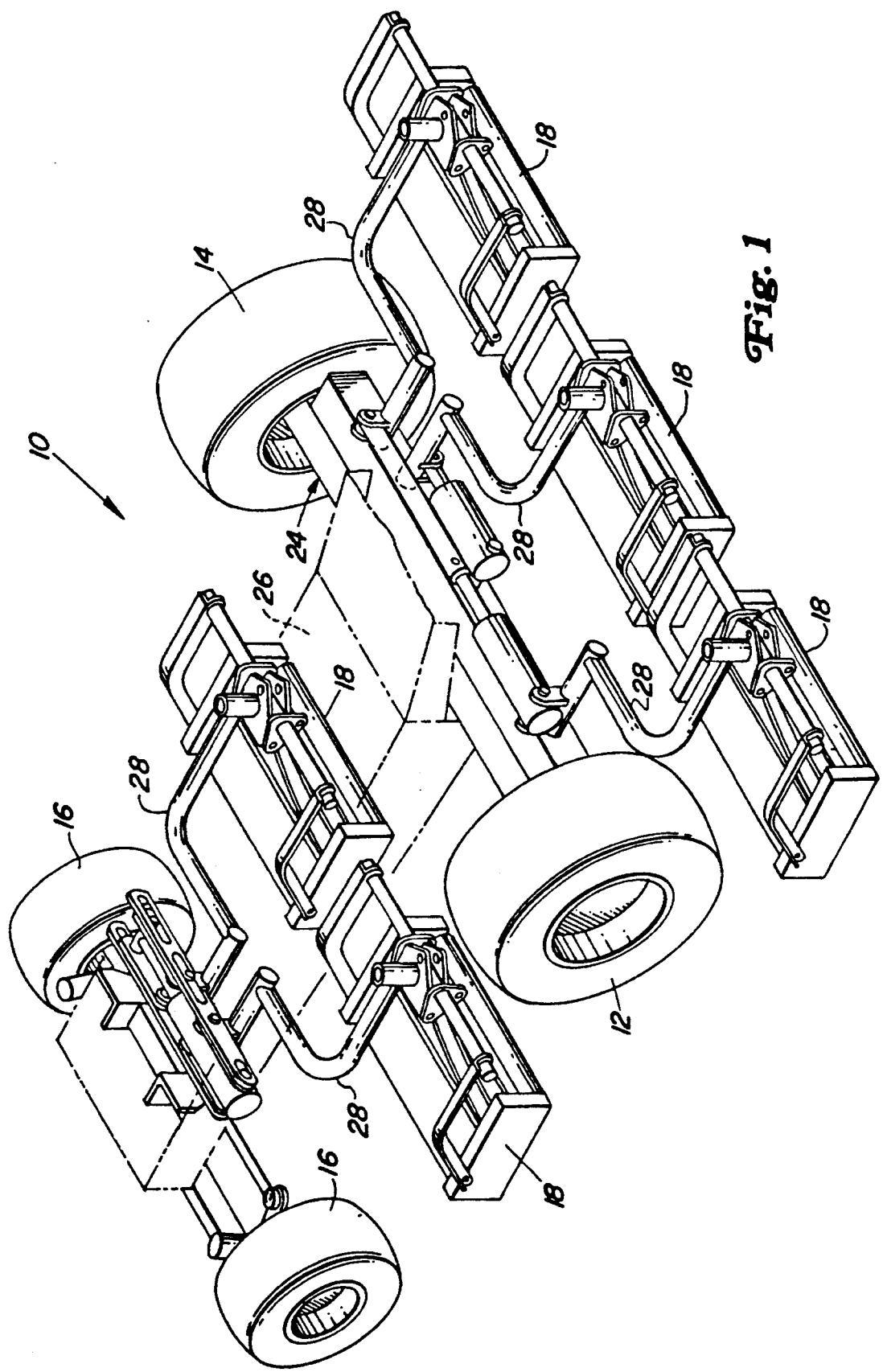
FIG. 1 is a partial perspective view of a reel mower vehicle according to the preferred embodiment showing various vehicle components removed for clarity.
Figure 2:
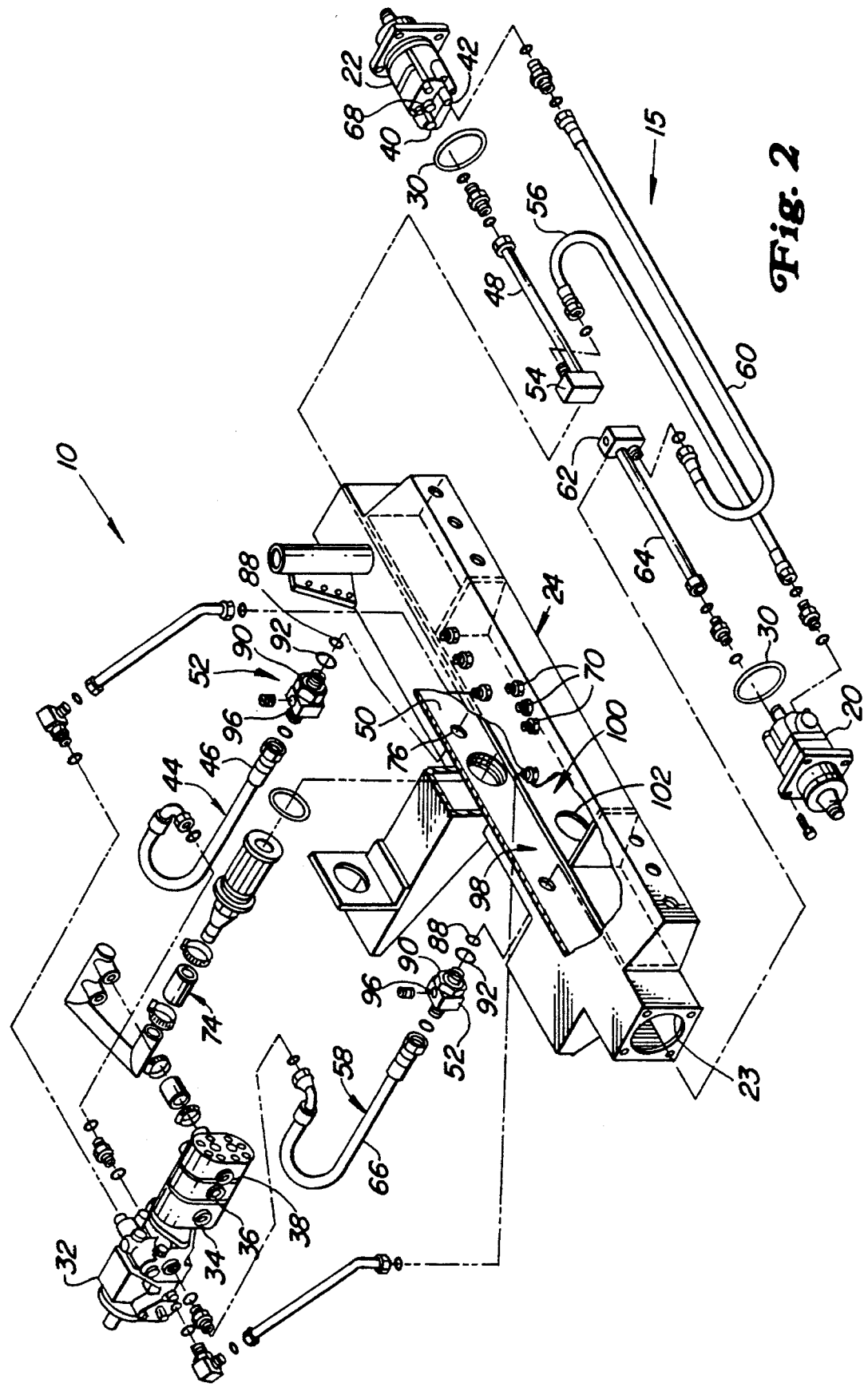
FIG. 2 is an exploded perspective view of the hydraulic system and axle reservoir according to the preferred embodiment of the present invention.
Figure 3:
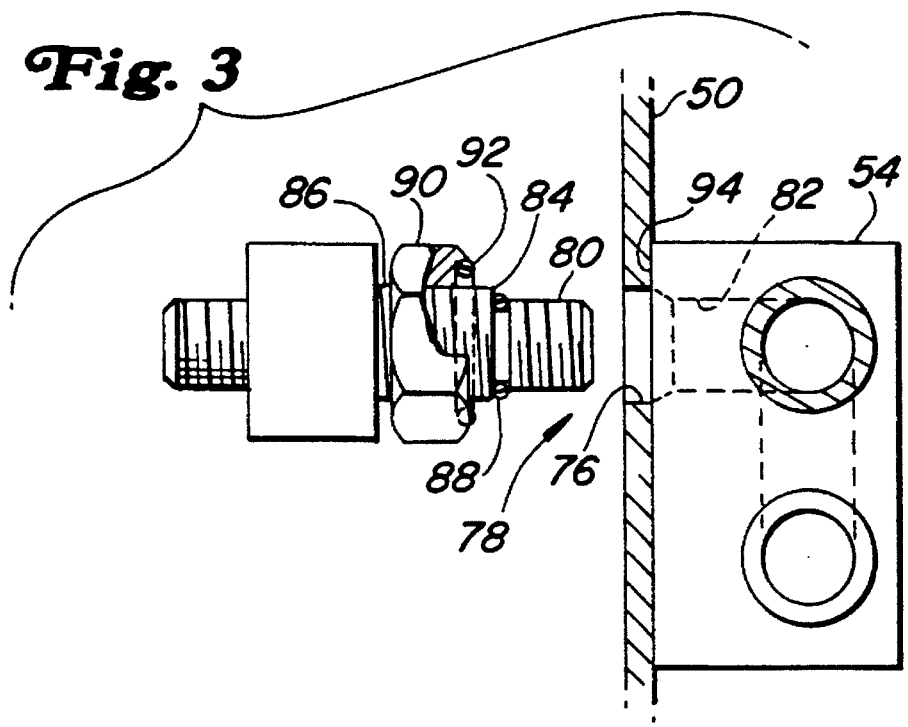
FIG. 3 is a side view of the coupling mechanism according to the preferred embodiment of the present invention.
Figure 4:
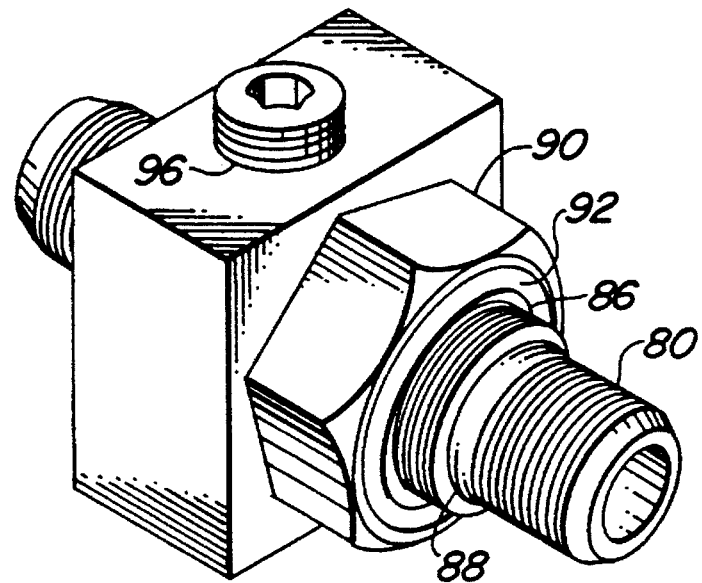
FIG. 4 is a perspective view of the nut and second seal according to the preferred embodiment of the present invention.

Referring now to FIG. 1, there is shown a turf mowing vehicle 10 according to the preferred embodiment of the present invention, and which is adapted for mowing highly manicured areas such as golf courses. The vehicle 10 includes right and left ground engaging front wheels 12 and 14. The front wheels 12 and 14 are driven by the vehicle's hydraulic system 15. A pair of ground engaging steerable wheels 16 are located to the rear of the vehicle. A plurality of reel mower cutting units 18 are coupled with the vehicle 10, and each include a cylindrical reel having cutting blades which are driven to rotate about a horizontal axis by the vehicle's hydraulic system 15. The cutting blades mow the grass and vegetation directly beneath the cutting units as the vehicle travels forward. Other vehicle functions or components, such as power steering, can also be driven by the vehicle's hydraulic system 15.

The right and left front wheels 12 and 14 are operatively coupled with respective right and left hydraulic motors 20 and 22 driven by the vehicle hydraulic system 15. The front wheel motors 20 and 22 are coupled with and supported by openings 23 in the outer end portions of a laterally extending box-like structure 24 which acts as a load bearing axle. The axle structure 24 receives operating loads from the front wheels 12 and 14 during forward travel. A portion of these operating loads are transferred to the vehicle frame 26 which is fixed with the axle structure 24. The axle structure 24 also pivotally supports the front push arms 28 to which the front cutting units 18 are attached. O-rings 30 positioned between the wheel motors 20, 22 and the axle structure 24 generally seal the interior of the axle structure 24 and thereby allow the axle structure 24 to contain hydraulic fluid and act as the hydraulic reservoir for the vehicle's hydraulic system 15. The wheel motors 20 and 22 generally fill or occupy the entire openings and 23 thereby act as end walls which contain fluid within the axle reservoir 24.

Next, the preferred embodiment of the vehicle's hydraulic system 15 will be discussed. The vehicle 10 includes a main hydraulic pump 32 which is driven by an output shaft of the vehicle's power source or engine. The pump 32 drives the hydraulic wheel motors 20 and 22. Three stacked pumps 34, 36 and 38 are driven by a common shaft (not shown). The first two stacked pumps 34 and 36 drive the reel motors, and the third stacked pump serves as an auxiliary.

A plurality of hose lines are provided for routing hydraulic fluid from the pump 32 to the right and left motors 20 and 22. According to the preferred embodiment, each motors' input and output ports 40 and 42 extend laterally inwardly within the interior of the axle structure 24. A hydraulic line 44 extends between the pump and the left motor's input port 40. This hydraulic line 44 includes an exterior portion or line 46 which is located outside the axle structure 24, and also includes a rigid interior portion or line 48 which is located inside the axle structure 24 and is coupled with the left motor's input port 40. The interior and exterior hose lines 46 and 48 are coupled together proximate the wall 50 of the axle structure 24 via a coupling mechanism 52 which allows operative fluid communication therebetween. The coupling means 52 will be described in more detail below. The rigid interior line 48 includes a first branch portion 54 which directs flow in parallel to both the right and left motors 20 and 22. A flexible or non-rigid hydraulic line 56 extends generally in a loop from the first branch 54 to the input port 40 of the right motor 20. The right and left motors 20 and 22 are therefore connected in parallel relation to allow fluid from the pump 32 to flow to both left and right motors 20 and 22 for driving both wheels 12 and 14.

Hydraulic return lines 58 are also provided for routing fluid back to the pump 32 once it has passed through the motors 20 and 22. The output port 42 of the left motor 22 is coupled with a flexible hydraulic line 60 which extends in a loop and is coupled with a second branch 62. A rigid hydraulic line 64 extends between the right motor's output port 42 and the second branch 62. The second branch 62 routes the flow from each motor 20 and 22 into an exterior return line 66 which extends between the second branch 62 and the pump 32. The hydraulic circuit thereby routes fluid back to the pump 32 after it has passed through the right and left motors 20 and 22. The pump 32 can also be reversed in conventional fashion for reversing the flow in the hydraulic circuit to thereby reverse direction of vehicle travel.

The right and left motors 20 and 22 provide case drains 68 for allowing hydraulic fluid which has leaked from the internal motors to drain from the case which houses the motor. These case drains 68 empty directly into the interior of the axle structure 24 which acts as a reservoir. Since the case drains 68 are in direct fluid communication with the reservoir 24, no additional hose lines are required. The cost of manufacture is correspondingly decreased, and clutter within the vehicle's interior is eliminated. The motors carried by the cutting units and which hydraulically drive the cutting reels also include case drains. Hose lines 72 extend from these more remote case drains, and attach directly to the axle structure 24 for allowing drained fluids to empty into the reservoir 24. The preferred embodiment includes threaded male portions 70 which are welded directly to the walls of the axle structure 24 for allowing the hose lines 72 from the remote case drains to be coupled directly thereto. The need for a manifold is eliminated by coupling the case drain hose lines 72 directly to the axle structure 24 which acts as a reservoir, thereby further reducing clutter within the interior of the vehicle 10. Additional threaded male portions 71 which are welded directly to the axle structure 24 are coupled with the return lines (not shown) from the reel mower cutting unit hydraulic motors, and serve to direct the return fluid into the axle reservoir 24.

The pump 32 is provided with a hydraulic line 74 extending to the axle structure reservoir 24 such that the pump 32 can access as needed the hydraulic fluid being stored in the reservoir 24.

Next, the coupling mechanism 52 according to the preferred embodiment will be discussed. The interior line 48 and exterior line 46 which extend between the pump 32 and the left motor 22 are coupled together by a coupling mechanism 52 proximate an opening or aperture 76 in the wall of the axle structure 24. A mating coupling means 78 is formed between the interior 48 and exterior 46 lines for sealing the two lines together to allow fluid flow therebetween. The mating coupling mechanism 78 includes a first threaded male portion 80 coupled with the exterior line portion 46. The mating coupling means 78 also includes a threaded female portion 82 formed in the first branch portion 54 for receiving the first male portion 80. A ledge means 84 is defined between the first threaded male portion 80 and a second threaded portion 86 which has a larger diameter than the first threaded male portion 80. A first seal means 88 is coupled with the ledge 84 for abutting the first branch portion 54 when the first male portion 80 and the female portion 82 are threaded together. A tight seal is thereby formed which generally prevents the fluid flowing through the line from leaking at the connection of the exterior 46 and interior lines 48.

The coupling mechanism 52 also generally prevents reservoir fluid from leaking from the axle structure 24 through the opening 76 which the line passes through. A nut means 90 is threaded onto the second threaded portion 86 of the exterior line 46 and is tightenable against the exterior of the axle wall 50 for generally sealing the axle structure 24. An O-ring 92 coupled with the nut 90 forms a tight seal between the nut 90 and wall 50 when the nut 90 is tightened on the second threaded portion 86. The first branch portion 54 includes an abutment means or block portion 94 which is pressed into abutment with the interior of the wall 50 as the nut 90 is tightened. The wall 50 therefore becomes tightly squeezed between the O-ring 92 carried by the nut 90 and the block portion 94 of the first branch portion 54 for generally sealing the axle structure 24 and preventing fluid contained therein from leaking.

The preferred embodiment of each coupling mechanism 52 include a port 96 which is adapted to receive a hydraulic line (not shown) which, when installed, can be operatively coupled with respective rear wheels 16 for providing four-wheel-drive capabilities.

The axle structure 24 according to the preferred embodiment defines a space within which a variety of hydraulic lines are located. Conventional mechanisms for coupling hydraulic hose lines would be difficult to operate within the confined space provided inside the axle structure. Therefore, the preferred embodiment provides a mechanism which facilitates easy assembly of the hydraulic lines during assembly. The interior line 48 which extends from the input port 40 of the left motor 22 is generally rigid. During the manufacturing assembly process, the rigid interior line 48 is coupled to the first branch portion 54. The rigid interior portion 48 is then coupled with the left motor's input port 40, and the left motor 22 is then attached to the axle structure 24. As the left motor 22 is placed in position within its opening in the end of the axle structure 24, the rigid interior line 48 shifts into the axle structure 24. The rigidity of the interior portion 48 acts to position the first branch section 54 and block portion 94 in proper alignment with the opening 76 in the axle structure wall 50. This alignment allows the first threaded male portion 80 to be inserted through the opening 76 and be received by the threaded female portion 82 of the rigid interior line 48 without further manipulation or adjustment by the person assembling the mechanism. The nut 90 can then be tightened against the wall 50 of the axle structure 24 to generally seal the reservoir.

The motors 20 and 22 can also be detached from the reservoir 24 relatively easily for maintenance. The non-rigid interior hose line 58 which is coupled with the left motor's output port 42 extends in a loop and is coupled with the second branch section 62. To remove the left motor 22 for service, a reservoir drain (not shown) located beneath the axle reservoir is opened to drain the fluid from the reservoir. The coupling mechanism 52 is then disconnected from the first branch section 54. Since the rigid interior line 48 is no longer coupled with the exterior line 46, the left motor 22 can be unbolted and pulled outwardly from the end portion of the axle structure 24. The rigid interior line 48 remains rigidly coupled with the left motor's input port 40 as the motor 22 is pulled from the axle structure 24. The loop formed by the non-rigid interior line 58 provides slack which allows the left motor 22 to be pulled or detached from the end of the axle structure 24 without requiring the non-rigid line 58 to be disconnected. Also, the non-rigid interior line 56 which is coupled between the first branch portion 54 and the right motor's input port 40 remains coupled to the first branch 54 when the left motor 22 is pulled from the axle structure 24. The flexible interior line 56 includes a similar loop section which provides slack for allowing the left motor 22 to be pulled from the axle structure 24 without requiring the interior line 56 to be disconnected from the first branch 54 or the right motor 20. Detachment and disassembly of the motors 20 and 22 is therefore facilitated.

When maintenance is completed, the rigid interior line 58 and the left motor 22 attached thereto can be fed back into the end portion of the axle structure 24. As described above, the rigid interior line 48 will become aligned with the opening 76 in the axle structure 24 for receipt of the exterior line 46. Re-assembly of the mechanism after maintenance is completed is therefore facilitated.

The right wheel motor 20 is assembled and disassembled in a fashion similar to that described above for the left wheel motor 22. The left and right sides of the vehicle hydraulic system include many identical parts such that the assembly and operation of the left and right sides is generally identical. Furthermore, the use of identical parts decreases the number of parts required, thereby decreasing the cost of manufacturing the vehicle.

The axle reservoir 24 includes a rear box portion 98 which extends laterally directly between the wheel motors 20 and 22, and a front box portion 100 coupled to the rear box portion 98. An opening 102 is formed between the front and rear portions 100 and 98 for allowing fluid to flow therebetween. The threaded male portions 70 which receive case drain fluid from the various reel motors are coupled with the front box portion 100. The hydraulic pump 32 draws fluid from the reservoir 24 from a location at the rear of the rear box portion 98. The front and rear box portions 100 and 98 serve to define a relatively lengthy and labyrinthine path along which the fluid from the reel motor case drains must travel before it is drawn into the pump 32. The slow, twisted and relatively lengthy route which must be taken facilitates fluid cooling, allows particles of debris in the fluid to settle, and allows any gas bubbles in the fluid to rise to the surface within the reservoir.

I claim:

1. A hydraulic mechanism for a vehicle, comprising:

a hydraulic reservoir defining and interior portion within which hydraulic fluid is contained, said reservoir including a wall having an opening into the interior portion of the reservoir, a hydraulic pump positioned outside of said reservoir, at least one hydraulic motor having input and output ports, said motor being coupled with the hydraulic reservoir such that the input and output ports are positioned within the interior portion of the reservoir, said motor being detachably coupled with said reservoir generally closing said opening and blocking hydraulic fluid from passing through the opening, and hydraulic lines, a portion of which extend within the interior portion of the reservoir for operatively coupling the hydraulic pump with the input and output ports of the hydraulic motor for driving said hydraulic motor.

2. The invention of claim 1, wherein said at least one hydraulic motor includes right and left hydraulic motors operatively coupled with respective right and left ground engaging drive wheels, and said hydraulic reservoir includes laterally spaced outer end portions which rigidly support said respective right and left motors, said reservoir serving as a load bearing axle structure extending between said right and left driven wheels.

3. The invention of claim 1, wherein the hydraulic lines further comprise a rigid portion extending within the reservoir between one of said ports and an aperture formed in a wall of the reservoir, said rigid portion of hydraulic line being rigidly coupled to said motor for shifting therewith such that said rigid portion becomes aligned with said aperture when the motor is coupled with the reservoir.

4. The invention of claim 1, wherein the hydraulic lines include a generally flexible portion which extends inside the reservoir and is coupled with one of said ports, said flexible portion of hydraulic line extending generally in a loop which provides slack for allowing the motor to be detached and pulled from the reservoir without requiring said flexible portion of hydraulic line to also be detached.

5. A hydraulic mechanism used for driving a vehicle having a frame, said mechanism comprising:

right and left laterally spaced hydraulic motors which drive respective ground engaging wheels, an axle structure coupled with the frame and extending laterally between the right and left hydraulic motors for receiving operating loads from the ground engaging wheels, said axle structure defining openings into said axle structure, said right and left hydraulic motors being coupled with the axle structure for generally closing said openings for generally sealing said axle structure and adapting an interior portion of said axle structure to contain fluid and serve as a fluid reservoir, and a hydraulic pump which drives the hydraulic motors, said pump being in operative fluid communication with the interior of the axle structure for drawing fluid therefrom, said pump being positioned outside of the axle structure.

6. The invention of claim 5, wherein the motors include input and output ports which are positioned within the axle structure, and hydraulic lines extending between the pump and the input and output ports, and portions of said hydraulic lines extending within the axle structure.

7. The invention of claim 5, wherein each motor further includes a case drain positioned within the interior of the axle structure for draining directly into the axle structure.

8. The invention of claim 6, wherein said motors are detachably coupled with said axle structure, and at least one of the portions of each hydraulic line is positioned within the axle structure and is generally flexible for extending generally in a loop which provides slack for allowing the respective motor to be detached and pulled from the reservoir without requiring said flexible portions of hydraulic line to be operatively detached from the motors.

9. A hydraulic mechanism used for driving a vehicle having a frame, said mechanism comprising:

right and left laterally spaced hydraulic motors which drive respective ground engaging wheels, said hydraulic motors each including input and output ports, an axle structure which extends laterally between the right and left hydraulic motors for receiving operating loads from the ground engaging wheels and transferring at least a portion of said loads to the vehicle frame, said right and left hydraulic motors being rigidly supported by laterally outer portions of the axle structure such that the input and output ports of the motors are positioned within the axle structure, said axle structure defining an interior portion which is generally sealed for acting as a reservoir to contain hydraulic fluid, a hydraulic pump which drives the hydraulic motors, said pump being carried by the vehicle outside of the axle structure, a plurality of hydraulic lines which operatively couple the pump with each of the motors, said plurality of hydraulic lines including interior lines positioned within the interior portion of the axle structure for connection with the input and output ports of the motors.

10. The invention of claim 9, wherein each motor further includes a case drain positioned within the interior of the axle structure for draining directly into the interior of the axle structure.

11. The invention of claim 9, wherein said plurality of hydraulic lines also include a plurality of exterior lines, said exterior lines extending outside of the axle structure, said interior lines further include a rigid interior line operatively coupled with a motor's ports, and said interior lines also include a generally non-rigid line which is operatively coupled with the said motor's other port, said non-rigid interior line being generally looped within the reservoir for providing slack in said line for allowing said motor to be pulled from the reservoir without requiring the non-rigid portion to be disconnected.

12. The invention of claim 9, wherein said motors are detachably coupled with the axle structure, and said interior line further includes a non-rigid line which extends generally in a loop which provides slack for allowing the motor to be detached and pulled from the axle structure without requiring said non-rigid line to be uncoupled.

13. The invention of claim 9, wherein said plurality of hydraulic lines also include exterior lines extending outside of the axle structure, a coupling mechanism is provided for operatively coupling at least one interior and one exterior line in the vicinity of a wall of the axle structure, said coupling mechanism comprising:

a first threaded male portion coupled with said one exterior line, a second threaded male portion coupled with said one exterior line and having a larger diameter than the first male portion for defining a ledge between the first and second male threaded portions, a first seal carried with the ledge, a threaded female portion coupled with said one interior line for receiving the first male portion, said first seal being in sealing abutment between the ledge and said one interior line when the first male portion is threaded into the female portion to thereby seal said exterior and interior lines for operative fluid communication, a nut threaded onto the second threaded male portion, a second seal carried by the nut, said nut being adjustable on the second threaded portion for operatively pressing the second seal against the exterior of the wall of the reservoir for preventing fluid from leaking from the reservoir.

14. The invention of claim 13, wherein the one interior line includes an abutment portion which abuts the interior of the wall of the axle structure when the nut is tightened on the second threaded portion.

15. The invention of claim 13, wherein said one interior line is generally rigid.

16. The invention of claim 15, wherein said rigid interior line is operatively coupled with one of the motor's ports, and another interior line is generally non-rigid and is operatively coupled with said motor's other port, said non-rigid interior line being generally looped within the reservoir for providing slack in said line for allowing said motor to be pulled from the reservoir without requiring the non-rigid line to be disconnected.

17. A mechanism couplable with a vehicle's hydraulic pump, comprising:

a hydraulic reservoir, right and left hydraulic motors operatively coupled with respective right and left ground engaging drive wheels, said motors having input and output ports, a portion of said motors being received within the hydraulic reservoir such that the input and output ports are positioned within the reservoir, laterally spaced outer end portions defined by the reservoir for rigidly supporting the respective right and left motors, said reservoir serving as a load bearing axle structure extending between the right and left driven wheels, and hydraulic lines, a portion of which extend within the reservoir for operatively coupling the hydraulic pump with the input and output ports of the hydraulic motors for driving said hydraulic motors.

18. A mechanism couplable with a vehicle's hydraulic pump, comprising:

a hydraulic reservoir, at least one hydraulic motor having input and output ports, a portion of said motor being received within the hydraulic reservoir such that the input and output ports are positioned within the reservoir, and hydraulic lines, a portion of which extend within the reservoir for operatively coupling the hydraulic pump with the input and output ports of the hydraulic motor for driving said hydraulic motor, wherein said hydraulic lines further comprise a rigid portion extending within the reservoir between one of said ports and an aperture formed in a wall of the reservoir, said rigid portion of hydraulic line being rigidly coupled to said motor for shifting therewith, said rigid portion being aligned with said aperture when the motor is coupled with the reservoir.

19. A mechanism couplable with a vehicle's hydraulic pump, comprising:

a hydraulic reservoir, at least one hydraulic motor having input and output ports, a portion of said motor being received within the hydraulic reservoir such that the input and output ports are positioned within the reservoir, and hydraulic lines, a portion of which extend within the reservoir for operatively coupling the hydraulic pump with the input and output ports of the hydraulic motor for driving said hydraulic motor, wherein the hydraulic lines further include a generally flexible portion which extends inside the reservoir and is coupled with one of said ports, said flexible portion of hydraulic line extending generally in a loop which provides slack for allowing the motor to be detached and pulled from the reservoir without requiring said flexible portion of hydraulic line to also be detached.

* * * * *